Nov. 25, 1941.  E. D. TREANOR  2,264,057
COIL SUPPORT FOR ELECTRICAL INDUCTION APPARATUS
Filed Aug. 21, 1940
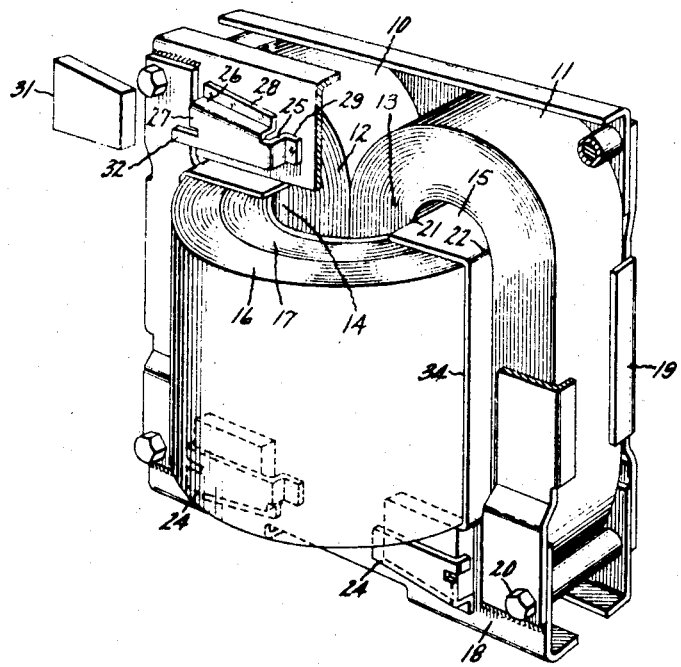
Inventor:
Edward D. Treanor,
by Harry E. Dunham
His Attorney.

Patented Nov. 25, 1941

2,264,057

UNITED STATES PATENT OFFICE 2,264,057

COIL SUPPORT FOR ELECTRICAL INDUCTION APPARATUS

Edward D. Treanor, Pittsfield, Mass., assignor to General Electric Company, a corporation of New York Application August 21, 1940, Serial No. 353,470

3 Claims. (Cl. 175—356)

The present invention relates to electrical induction apparatus having a magnetic core structure and one or more windings encircling a leg of the core structure, and more particularly to means for supporting the windings relative to the core structure.

In electrical induction apparatus such as transformers and reactors, the magnetic core structure defines one or more windows through which the windings are arranged encircling one or more legs of the core structure. Excessive currents due to large overloads or short circuits flowing through the windings set up forces tending to displace the coils from their normal positions relative to each other and to the core structure within the limits of the spacing between the opposite ends of the winding coils and the core yokes. If the coils are not properly secured relative to the core structure, the end turns of the coils will be forced against the relatively sharp corners of the core window and after a period of time, depending upon the severity and frequency of such abnormal forces, the winding insulation may be ultimately broken through, followed by a grounding of the transformer winding. In the construction of certain types of transformers it is possible to make such a tight fit between the core and the winding coil structures with suitable interposed insulation so that substantially no end play exists for permitting axial movements of the coils within the core window under the conditions mentioned. It is oftentimes impracticable, however, to provide such a tight fit between the winding coil or coils and core so that special means must be provided for securing the winding rigidly with respect to the core structure.

It is therefore an object of the present invention to provide a new and improved arrangement for rigidly securing the winding structure of apparatus of the type described relative to the core structure.

Further objects and advantages of the invention will appear from the following description taken in connection with the accompanying drawing, while the scope of the invention will be pointed out with greater particularity in the appended claims.

The single figure of the drawing is a view in perspective of a transformer embodying the invention, certain portions being broken away for the purpose of more clearly illustrating transformer details.

The transformer shown comprises a core structure which, for example, may be of the wound type and divided into two elements 10 and 11 having adjacent portions 12 and 13 forming a winding leg and defining windows 14 and 15. Surrounding the winding leg of the core structure and extending through the windows defined thereby is a winding comprising concentric primary and secondary coils 16 and 17, respectively, the leads of which have been omitted from the drawing as being non-essential to an understanding of the instant invention. The core structure is clamped between fabricated rectangular frames 18 and 19 arranged on the opposite sides thereof and bolted together by bolts 20.

In the case of wound core elements as illustrated, the windows cannot practicably be made with square ends for fitting tightly around the coil ends and are generally somewhat curved as illustrated. If the winding coils are not rigidly secured relative to each other and to the core structure, heavy overcurrents will cause axial movements of the coils relative to each other and force one or the other, or both, coils into engagement with the core elements at the window corners, such as indicated at 21 and 22, and which are apt to break through the coil insulation at these points.

In accordance with the present invention, means are provided on the clamping frame of the core structure defining wedge-shaped slots adjacent the opposite ends of the coils and into which slots wedges are driven in firm engagement with the adjacent aligned surfaces of the coils to secure them firmly in position. In the illustrated embodiment each wedge-shaped slot is defined by a stamped sheet metal pocket member 24 having an end wall 25 and an edge wall 26, bent at right angles with respect to the side wall portion 27. The member 24 may be secured as by spot welding of the flanged portions 28 and 29 to the clamping frames 18 and 19 adjacent the ends of the winding at the core windows. It will be noted that the edge wall 26 faces the end surface of the winding but at a slight angle with respect thereto. A wedge-shaped block 31 may be driven into the open end of the pocket member 24 opposite the end wall 25, one edge of the block being tapered at an angle corresponding to the angle formed between the edge wall 26 of the pocket member and the end surface of the winding. With the wedge block driven into position, it may be secured in place by bending the lug portion 32 extending from the end of the side wall 27 over the outer end of the block.

U-shaped sheets 34 of insulating material are preferably provided in the core windows extending over the outer sides and ends of the winding, the sheets being somewhat wider than the core structure so that bearing surfaces will be provided thereby between the wedge blocks and the winding to prevent injury to the latter as the wedges are driven into position. It is preferred that the various wedge blocks at the opposite ends of the winding and on both sides of the core structure be gradually tapped home and substantially uniformly in order that no undue stresses will be set up in either the winding or the core structure. With the winding coils rigidly supported relative to each other and to the core structure by the wedge arrangement described, heavy over current conditions impressed upon the winding will be ineffective in causing relative movements therebetween and injury to the end portions thereof.

The coil supporting arrangement has been illustrated and described as being particularly applicable for use with a core structure of the wound type, but it will be obvious that the invention is equally applicable for supporting winding coils within the windows of other forms of magnetic core structures. It is equally obvious that the invention is not necessarily limited even to transformers and that this is but one form of electrical induction apparatus with which the invention may be used.

While I have described the principle of my invention and the apparatus which I consider to represent the preferred embodiment thereof, I desire to have it understood that the specific arrangement shown is merely illustrative and that the invention may be carried out by other means.

What I claim as new and desire to secure by Letters Patent of the United States is:

1. In electrical induction apparatus having a magnetic core structure defining a window, a winding having one side extending through said window, said core structure including a clamping frame, a member secured to said frame forming a wedge-shaped pocket having an open side facing said winding and wedge means arranged in said pocket and engaging said winding for securing said winding against movement within said window.

2. In electrical induction apparatus, a magnetic core structure defining a window, a pair of concentric winding coils extending through said window, a clamping frame for said core structure, means secured to said frame defining a wedge-shaped slot between said coils and said frame, and a wedge driven into said slot to engage with the aligned ends of said coils and secure said coils relative to each other and to said core structure, said means including additional means for securing said wedge in position.

3. In electrical induction apparatus, a magnetic core structure defining a window, a pair of concentric winding coils extending through said window, a clamping frame for said core structure, a member secured to said frame adjacent the aligned ends of said coils and having a sloping wall facing said coil ends, a wedge arranged between said sloping wall and said coil ends and a portion of said member being bent over the end of said wedge to secure said wedge in position.

EDWARD D. TREANOR.